(12) United States Patent
Daugherty et al.

(10) Patent No.: US 9,796,324 B2
(45) Date of Patent: Oct. 24, 2017

(54) MULTI-USE PANEL FOR BULKHEAD

(71) Applicant: Ancra International LLC, Azusa, CA (US)

(72) Inventors: Lyle M. Daugherty, Wake Forest, NC (US); Howard T. Knox, Independence, KY (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 15/205,131

(22) Filed: Jul. 8, 2016

(65) Prior Publication Data
US 2017/0015234 A1    Jan. 19, 2017

Related U.S. Application Data

(60) Provisional application No. 62/193,431, filed on Jul. 16, 2015.

(51) Int. Cl.
*B60P 7/08* (2006.01)
*B60P 7/14* (2006.01)

(52) U.S. Cl.
CPC ..................... *B60P 7/14* (2013.01)

(58) Field of Classification Search
CPC ....................................................... B60P 7/14
USPC ........ 410/104, 105, 130–135, 137–139, 141, 410/142, 150, 46, 89, 129; 52/202, 203; 244/118.1, 137.1; 296/24.4, 37.6; 108/55.1, 55.3
See application file for complete search history.

(56) References Cited

U.S. PATENT DOCUMENTS

| | | | |
|---|---|---|---|
| 3,059,593 A * | 10/1962 | Mack | B60P 7/14 220/541 |
| 3,433,184 A | 3/1969 | Addy | |
| 3,478,995 A * | 11/1969 | Lautzenhiser | B61D 45/001 108/55.5 |
| 3,927,769 A | 12/1975 | Maslow, et al. | |
| 4,013,020 A | 3/1977 | Schoeller et al. | |
| 4,880,342 A | 11/1989 | Pradovic | |
| 4,986,706 A | 1/1991 | Williams, Jr. | |
| 5,408,937 A | 4/1995 | Knight et al. | |

(Continued)

FOREIGN PATENT DOCUMENTS

JP    6 191536    7/1994

OTHER PUBLICATIONS

International Search Report and Written Opinion for PCT/US2016/041702, dated Jul. 10, 2016, 15 pp.

*Primary Examiner* — Stephen Gordon
(74) *Attorney, Agent, or Firm* — Brinks Gilson & Lione

(57) ABSTRACT

A bulkhead is provided. The bulkhead includes a panel with that extends between first and second primary and secondary edges that are perpendicular to each other. The first side supports a first plurality of brackets and a second plurality of brackets, the first plurality of brackets disposed on a first side of a secondary centerline of the panel that is parallel to the first and second secondary edges, the second plurality of brackets disposed on a second side of the secondary centerline that is opposite from the first side of the secondary centerline. Each of the first plurality of brackets and the second plurality of brackets includes an engaging portion that contacts the first side of the panel and a cantilevered portion that extends away from the first side of the panel and toward the secondary centerline.

20 Claims, 12 Drawing Sheets

(56) References Cited

U.S. PATENT DOCUMENTS

| | | | |
|---|---|---|---|
| 5,813,355 A | 9/1998 | Brown et al. | |
| 6,827,534 B2* | 12/2004 | Onken | B60P 3/20 |
| | | | 410/121 |
| 6,910,668 B2 | 6/2005 | Henning | |
| 6,981,828 B2 | 1/2006 | Davies et al. | |
| 7,188,817 B2 | 3/2007 | Henning | |
| 7,293,813 B2 | 11/2007 | Squyres et al. | |
| 7,357,610 B2 | 4/2008 | Squyres | |
| 7,731,462 B2 | 6/2010 | Squyres et al. | |
| 8,172,494 B1 | 5/2012 | Knox | |
| 8,230,793 B2 | 7/2012 | Apps | |
| 8,356,963 B2* | 1/2013 | Frett | B61D 45/002 |
| | | | 410/104 |
| 8,899,661 B2 | 12/2014 | Knox et al. | |
| 2005/0236547 A1 | 10/2005 | Henning | |
| 2007/0181045 A1 | 8/2007 | Smyers | |
| 2008/0112771 A1* | 5/2008 | Barney | B61D 3/04 |
| | | | 410/46 |
| 2008/0308015 A1 | 12/2008 | Apps | |
| 2009/0016840 A1 | 1/2009 | Squyres et al. | |
| 2009/0050030 A1 | 2/2009 | Apps et al. | |
| 2010/0043676 A1 | 2/2010 | Apps et al. | |
| 2010/0147198 A1 | 6/2010 | Palmer | |
| 2010/0236455 A1 | 9/2010 | Apps | |
| 2011/0139040 A1 | 6/2011 | Apps et al. | |
| 2011/0318133 A1* | 12/2011 | Arnold | B60P 7/15 |
| | | | 410/150 |
| 2012/0048154 A1 | 3/2012 | Toomer et al. | |
| 2012/0240828 A1 | 9/2012 | Apps et al. | |
| 2012/0256436 A1 | 10/2012 | Knox et al. | |
| 2012/0291677 A1 | 11/2012 | Lin | |
| 2013/0032507 A1 | 2/2013 | Du Toit et al. | |

\* cited by examiner

MULTI-USE PANEL FOR BULKHEAD

CROSS-REFERENCE TO RELATED APPLICATIONS

This application claims priority from U.S. Provisional Application No. 62/193,431 filed Jul. 16, 2015, the entirety of which is hereby fully incorporated by reference herein.

TECHNICAL FIELD

This application relates to removable bulkheads that can be used in an environment, such as a cargo compartment of a truck or related cargo compartments.

BRIEF SUMMARY

A first representative embodiment of the disclosure is provided. The embodiment includes a bulkhead. The bulkhead includes a panel with a first side and a second side, the first side and second side are fixed together, the panel extends to parallel first and second primary edges and parallel first and second secondary edges, opposite ends of the first and second primary edges each meet an end of one of the first and second secondary edges, each of the first and second primary edges each disposed perpendicular to each other. The first side supports a first plurality of brackets and a second plurality of brackets, the first plurality of brackets disposed on a first side of a secondary centerline of the panel that is parallel to the first and second secondary edges, the second plurality of brackets disposed on a second side of the secondary centerline that is opposite from the first side of the secondary centerline. Each of the first plurality of brackets and the second plurality of brackets includes an engaging portion that contacts the first side of the panel and a cantilevered portion that extends away from the first side of the panel and toward the secondary centerline.

A second representative embodiment of the disclosure is provided. The embodiment includes a bulkhead. The bulkhead includes a first side and a second side, the first side and second side fixed together to form a panel, the panel extends to parallel first and second primary edges and parallel first and second secondary edges, opposite ends of the first and second primary edges each meet an end of one of the first and second secondary edges, each of the first and second primary edges each disposed perpendicular to each other. The first side supports a first plurality of brackets and a second plurality of brackets, the first plurality of brackets disposed on a first side of a secondary centerline of the panel that is parallel to the first and second secondary edges, the second plurality of brackets disposed on a second side of the primary centerline that is opposite from the first side of the primary centerline. Each of the first plurality of brackets and the second plurality of brackets includes an engaging portion that contacts the first side of the panel and a cantilevered portion that extends away from the first side of the panel. The first side of the panel further comprises a plurality of elongate extensions disposed outwardly from a planar surface of the first side, wherein at least a portion of the plurality of elongate extensions collectively define at least two secondary valleys that each extend between the first and second primary edges and in parallel secondary centerline, wherein the first plurality of brackets extend within one of the secondary valleys, and the second plurality of brackets extend within the second of the secondary valleys, wherein each of the at least two secondary valleys are disposed upon opposite sides of the secondary centerline, and each of the secondary valleys are disposed between collective engaging portions of the first or second plurality of brackets that are proximate to the respective secondary valley and the secondary centerline.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE PRESENTLY PREFERRED EMBODIMENTS

Figure 9:
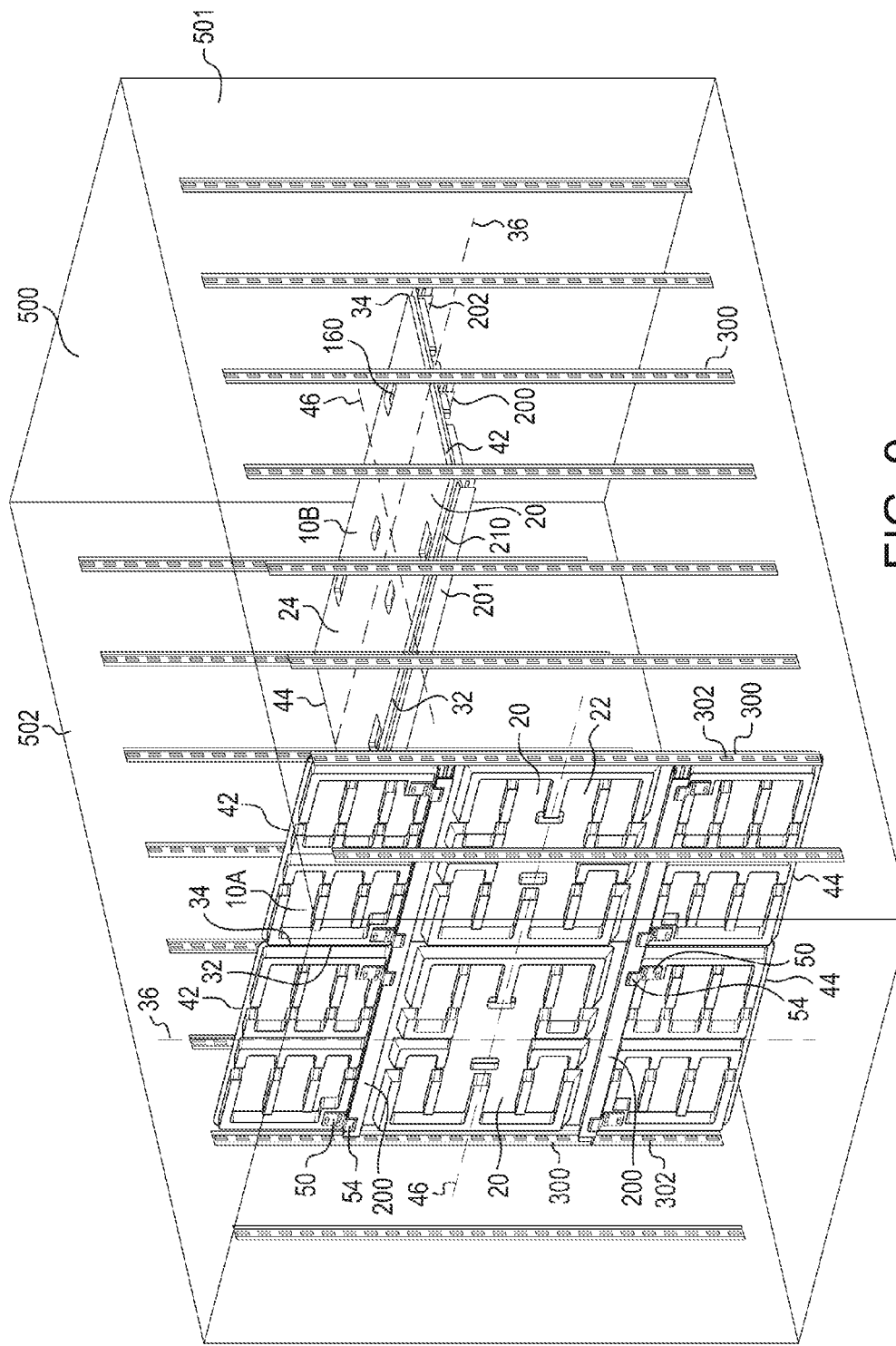
FIG. 9 is a perspective view of the bulkhead of FIG. 1 disposed vertically in a cargo container and a panel of FIG. 2 disposed horizontally upon three decking beams that are fixed within the cargo container.
Figure 10:
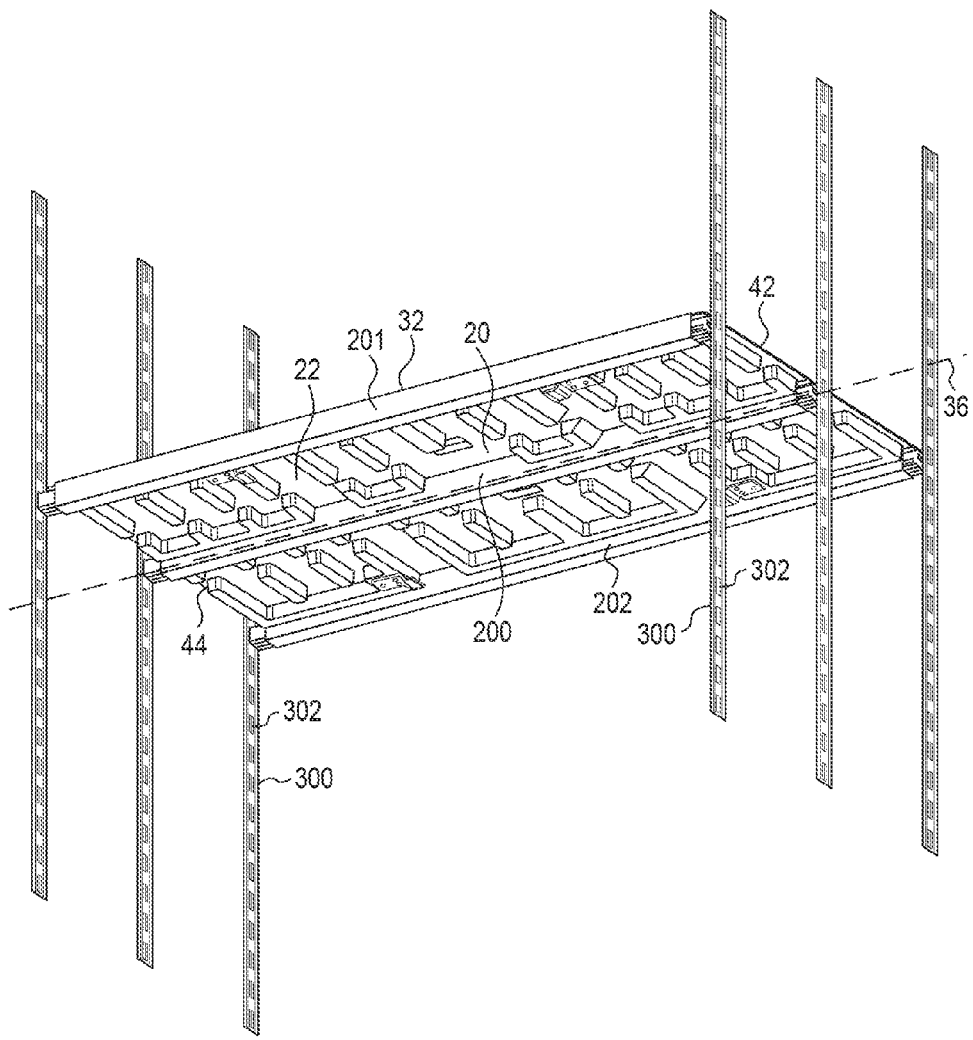
FIG. 10 is a lower perspective view of a panel supported horizontally within a cargo container.

Turning now to FIGS. 1-12, a bulkhead 10 is provided. The bulkhead 10 is configured to be disposed within an environment 500, such as a cargo compartment of a truck, or in other structures in the cargo or transportation industry, such as aircraft, railcars, boats, multiunit storage facilities, warehouses and distribution centers or the like. As depicted in FIG. 10, the bulkhead 10 (and specifically the panels 20, discussed below that make up the bulkhead when assembled) is configured to be disposed in two different configurations, a first position wherein the bulkhead is disposed in a vertical configuration to separate an environment to two different compartments (10A in FIG. 9), and a second position (10B in FIG. 9) wherein one or more of the panels 20 that form the bulkhead are disposed horizontally to serve as horizontal decking surface within the cargo compartment.

The bulkhead 10 is formed by a panel 20, and in some embodiments two (or more) identical panels 20. In embodiments where the bulkhead 10 is made of a single panel 20, the panel may be square and be about 96 inches long on all four sides, which is only slightly smaller than the height and width of a typical cargo compartment of a truck. In embodiments, where two panels 20 are provided to form the bulkhead 10, each panel 20 has a height of about 96 inches (to allow the panel 20 to extend from the floor of the cargo compartment to close to the ceiling and a width of about 48 inches, so that two panels disposed in a side by side manner collectively span 96 inches. The term "about" is specifically defined herein to include the specific value referenced as well as a dimension that is within 5% of the dimension both above and below the dimension. One of ordinary skill in the art will understand that the dimensions of the bulkhead 10 and the components that form the bulkhead are described with reference to a truck cargo compartment that is about 96 inches wide, and that the bulkhead 10 discussed herein can be used for other purposes and the changes in the size, shape, and orientation of the components of the bulkhead to be used for the other purposes could be easily made routine optimization and without undue experimentation.

As discussed in greater detail below and as shown in FIG. 10, the 48 inch width of the panels 20 allows the panels to rest horizontally upon and be supported by three horizontal fixed beams (such as conventional "E" decking beams) that are spaced at 24 inch centers. In this configuration, the panel 20 is positioned such that a first beam 200 is disposed under primary centerline 36 of the panel 20 (within a primary valley 132, discussed below), a second beam 201 is disposed below a first primary edge 32 of the panel, and the third beam 202 is disposed below a second primary edge of the panel. The term "primary" is used herein to refer to the longer dimension of the panel 20 for panels that are not square, and in embodiments where the panel 20 is about 96 inches long, the primary edges are each about 96 inches long. The term "secondary" as used herein is used to refer to the edges (and axes) that are perpendicular to the "primary" edge, which in this embodiment are about 48 inches long.

Figure 11:
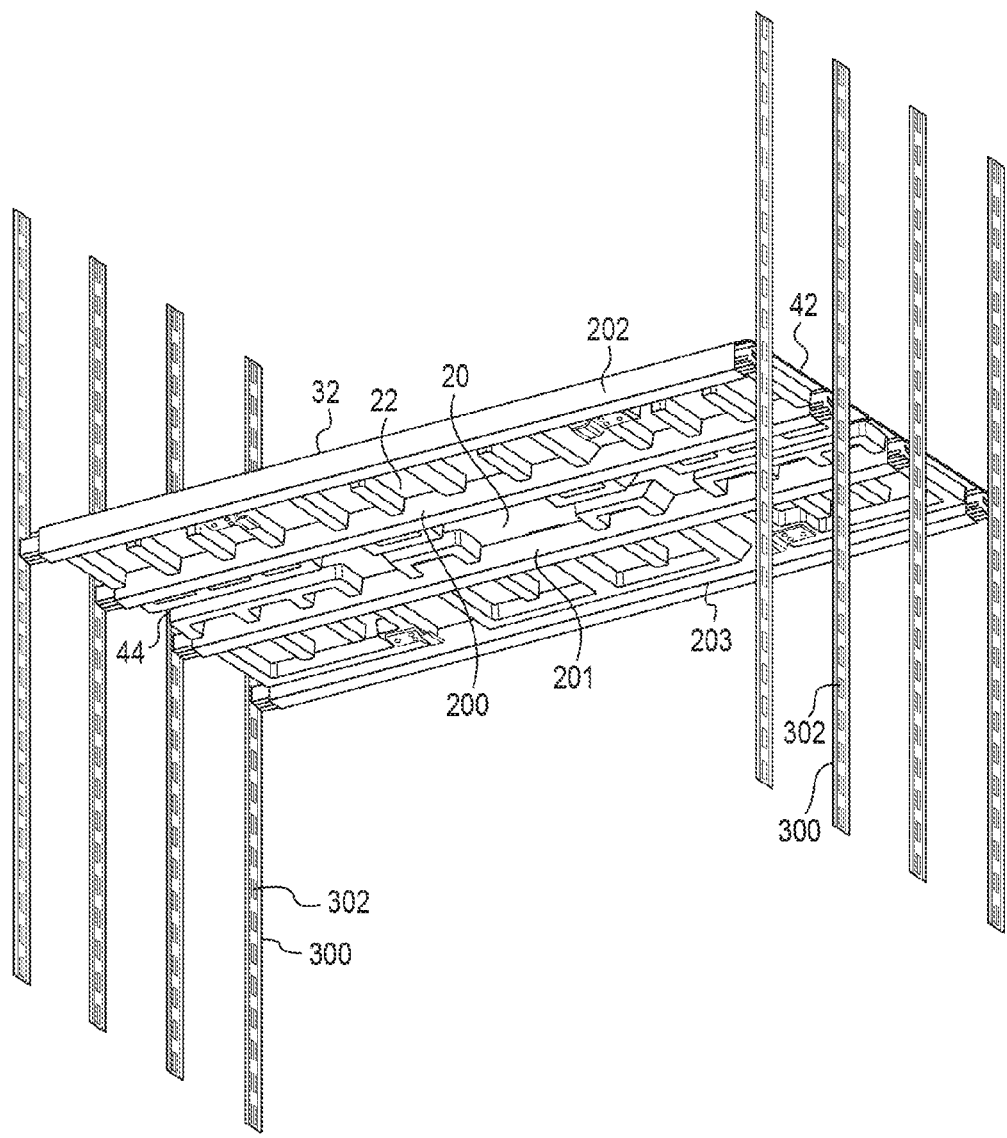
FIG. 11 is another lower perspective view of a panel supported horizontally within a cargo container.

As shown in FIG. 11, the 48 inch width of the panel 20 also allows the panel to rest horizontally upon and be supported by four horizontal fixed beams that are spaced at 16 inch centers. In this configuration, the panel is positioned such that two beams (200 and 201; FIG. 11) are disposed at 16 inch centers across the first surface (22) of the panel and extending within primary valleys 134, 136 (discussed below), with each beam spaced 8 inches outboard of the primary centerline 36 of the panel, and two other beams (202 and 203; FIG. 11) are disposed below the first primary edge 32 and the second primary edge 34, respectively. In this configuration (and the configuration at 24 inch centers discussed above) the panel 20 is preferably oriented such that the first and second primary edges 32, 34 of the panel 20 are disposed upon half of the width, or slightly less than half of the top surface 210 (FIGS. 5, 9) of the respective beam such that a second horizontal panel 20 mounted next to the first panel 20 can rest upon the other portion of the top surface 210 of the beam.

In embodiments wherein the panel 20 is supported by beams (such as decking beams 200 or in one or both of the configurations depicted herein as 10A and 10B) opposite ends of the beams may each be supported by opposite tracks 300 (with periodic apertures 301 for receiving a locking element of a beam) that may be mounted upon opposite side walls 501, 502 of the environment, such as the side walls of a cargo container. The tracks 300 may be conventional logistics track (with holes 302 to receive a locking member from a beam 200), such as E track which may be disposed vertically upon the inner surface of the cargo compartment at equal intervals, such as every 16 inches or every 24 inches. Alternatively, tracks could be mounted horizontally upon the side walls.

Figure 5:
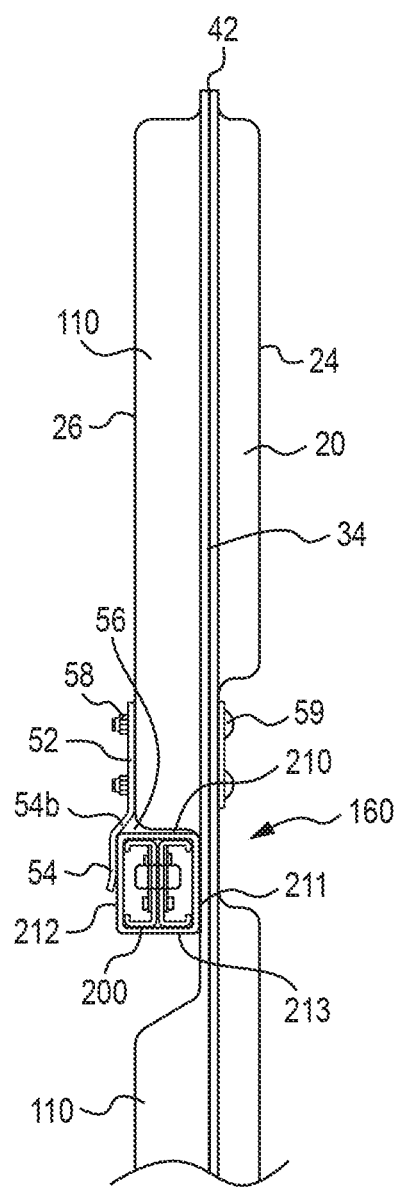
FIG. 5 is a side view of a portion of the bulkhead, showing a beam engaged through a bracket of the panel.
Figure 6:
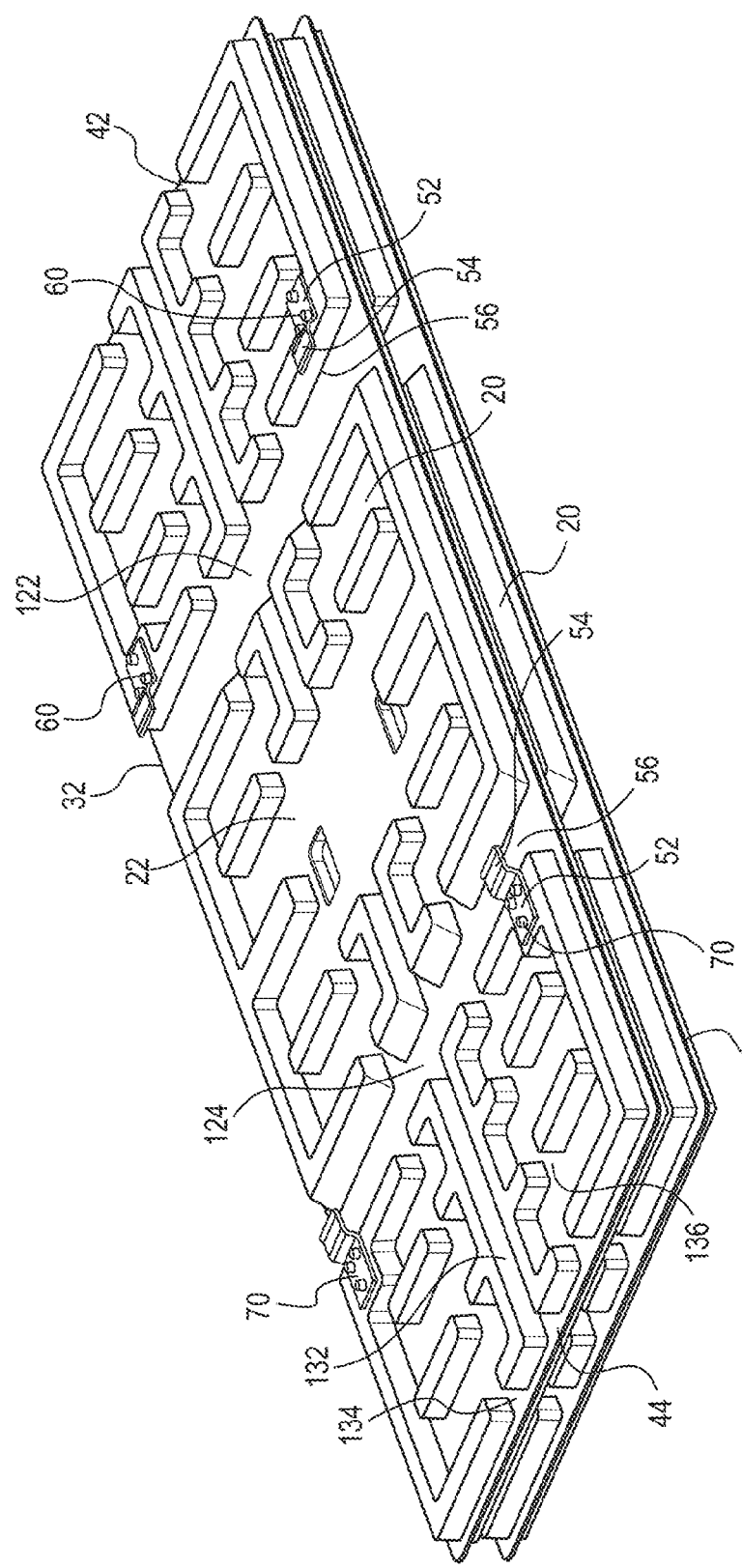
FIG. 6 is a perspective view of two panels of FIG. 2 stacked together.

The panel 20 is best shown in FIGS. 2-5. In some embodiments, the panel 20 is made using a thermoforming process. Two or more sheets 322, 324 may be formed using molds and combined by fusion through a conventional thermoforming process (at least along the edges 32, 34, 42, 44, but in some embodiments at other positions within the panel). The seams along the edges of the panel are best shown in FIGS. 5 and 6. The thermoforming process facilitates molding of the required contours into the separate top and bottom sheets. Typically, the sheets 322, 324 are made from high-density polyethylene (HDPE), or the like, and/or from fully recyclable material. In some embodiments, the separate thermoformed sheets 322, 324 may be made from materials that have one or both of: a) different durability; and b) different frictional characteristics to exploit these properties.

With the two sheets 322, 324 combined, a space 326 is defined therebetween, which may be hollow or partially or completely filled with a filler material, or a structural material (such as reinforcement ribs or other structures) for strength, stiffness, or other purposes. The sheets 322, 324 may be strategically fused by forming discrete portions of each sheet 322, 324 against each other to define elongate extensions, such as ribs 110, in some embodiments the lengths of at least some of the ribs 110 disposed orthogonally to each other. The transverse arrangement of the lengths of the ribs 110 affords greater multidirectional reinforcement. The panels 20 may be designed with ribs 110 that have different lengths and positioning, and one of ordinary skill in the art will understand after a thorough review of this specification that the length, size, and positioning of the ribs 110 is based upon the desired rigidity and strength of the panel as well as the desired placement of the primary and secondary valleys 132, 134, 136, 122, 124 (discussed below) upon the first side 22 of the panel 20. In some embodiments the ribs 110 may be monolithically formed with the first side 22 of the panel 20, while in other embodiments, the ribs 110 may be fixed onto the surface of the panel 20 with fasteners, adhesive, a key/keyway, a joint, or other locking structures known in the art.

Figure 12:
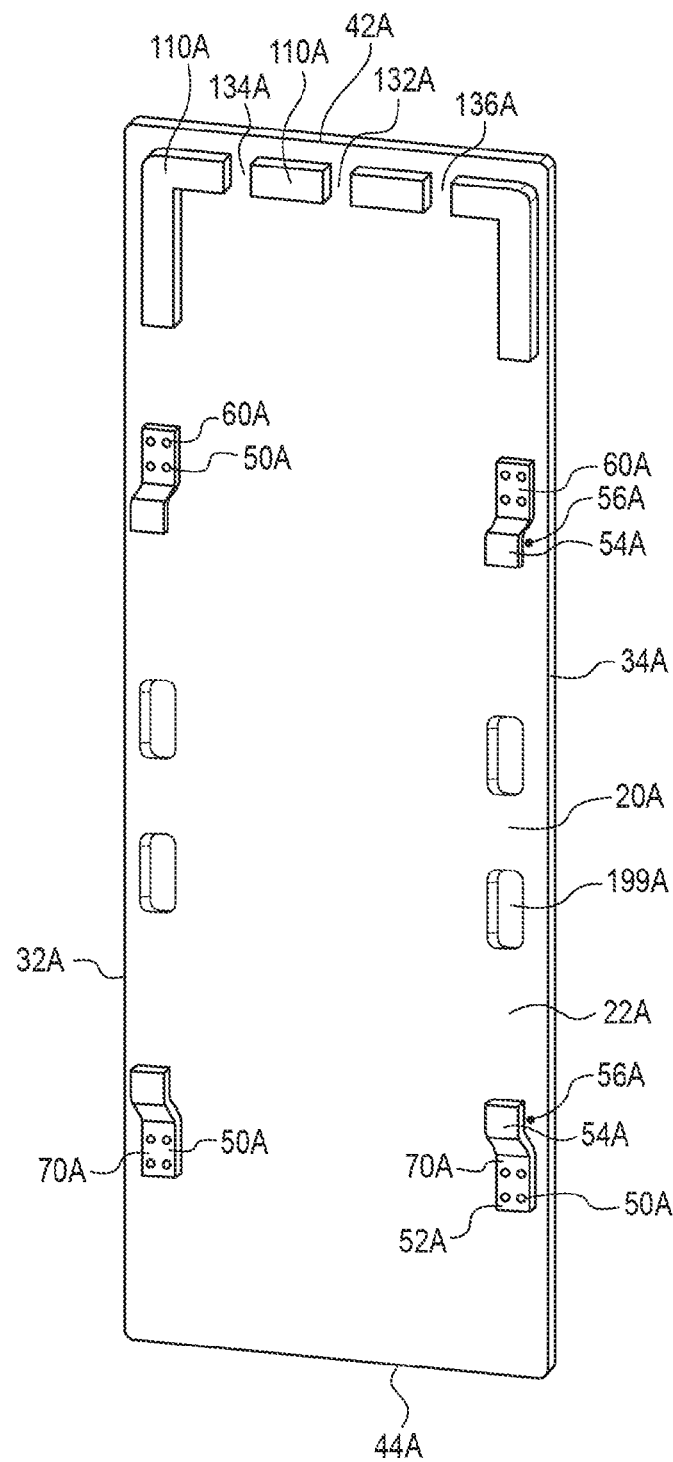
FIG. 12 is a perspective view of another panel that is usable to construct a bulkhead.

In other embodiments depicted in FIG. 12, a panel 20A may be formed from a single sheet, such as a single sheet of plywood or a single sheet of plastic or composite material. The panel 20A may support a plurality of brackets 50 on a side of the panel 20A in first and second secondary rows 60A, 70A (as discussed above) in order to receive beams 200 within spaces 56A defined between the cantilevered portion 54A of the bracket 50A and the panel 20A (similar to the panel 20 discussed elsewhere herein). The components in FIG. 12 that are similar to like components that are discussed with respect to the panel 20 are identified with the same element number with an "A" (e.g. 50 and 50A in FIG. 12), which for the sake of simplicity and for the sake of brevity are not again discussed here. In some embodiments, the panel 20A may include a plurality of ribs 110A that extend from the first side of the panel 20A and may be in the same number, shape, size or orientation orientations as the ribs 110 depicted with respect to the panel 20 or may be different number, size, shape, or orientation. (Some sample ribs 110A are depicted schematically in FIG. 12 for understanding purposes, and the actual panel 20A may have additional ribs 110 of this or a different design). As with the panel 20, the ribs 110A may be alignment features to create one or more primary valleys 132A, 134A, 136A (like primary valleys 132, 134, 136) to align the panel 20A upon beams when the panel 20A is used as a decking panel (as discussed herein and shown in FIGS. 9-11). The ribs 110A may be fixed onto the sheet (with fasteners, adhesive, a key/keyway, a joint or other locking structures known in the art).

The panel 20 includes a first side 22 and a second side 24. When the panel 20 is installed vertically to form a bulkhead within an environment, such as a cargo compartment of a truck (FIG. 9), the first side normally faces the rear door of the cargo compartment (or at least the separated space that will be have personnel access into once the bulkhead 10 is installed). When the bulkhead forms a space where there will be no personnel access, the second side 24 of the bulkhead normally faces that unoccupied space.

The panel 20 is defined by first and second opposite primary edges 32, 34 that run vertically when the panel 20 is installed within a bulkhead (with the panels 20 disposed vertically), and first and second opposite secondary edges 42, 44 that run horizontally when the panel 20 is installed within a bulkhead 10. In some embodiments, the panel 20 could be configured to be positioned horizontally (with two or more stacked panels) to form the bulkhead. In that case, the "primary valleys" would receive the beams therethrough (per the naming convention discussed above) because the valleys in that direction would be in parallel to the long side of the panel. The first and second primary edges 32, 34 extend to ends 32a, 32b, 34a, 34b, and the first and second secondary edges 42, 44 extend to ends 42a, 42b, 44a, 44b that meet with the ends of the intersection primary edges 32, 34. By convention, the second secondary edge 44 normally rests upon (or is proximate to) the floor of the cargo compartment when the panel is installed within a bulkhead. Each of the primary and second edges 32, 34, 42, 44 include a planar portion that extends for a certain width, such as at about 1.5 inches, or in other embodiments within a range of about 1 inch to about 3 inches, inclusive of all lengths within this range. As mentioned above, the planar portion of each edge is configured to rest upon a surface of a decking beam to support the panel 20 upon the decking beam at the edges of the panel as shown in FIGS. 9-11. In some embodiments, the planar portions of each edge extend through the same plane. In some embodiments, the planar portions each extend through the same plane P (FIG. 7) as the surface of the valleys 122, 124, 132, 134, 136 (discussed elsewhere herein) upon the first side 22 of the panel 20, such that the panel 20 rests horizontally upon several beams that are aligned at the same height.

Figure 2:
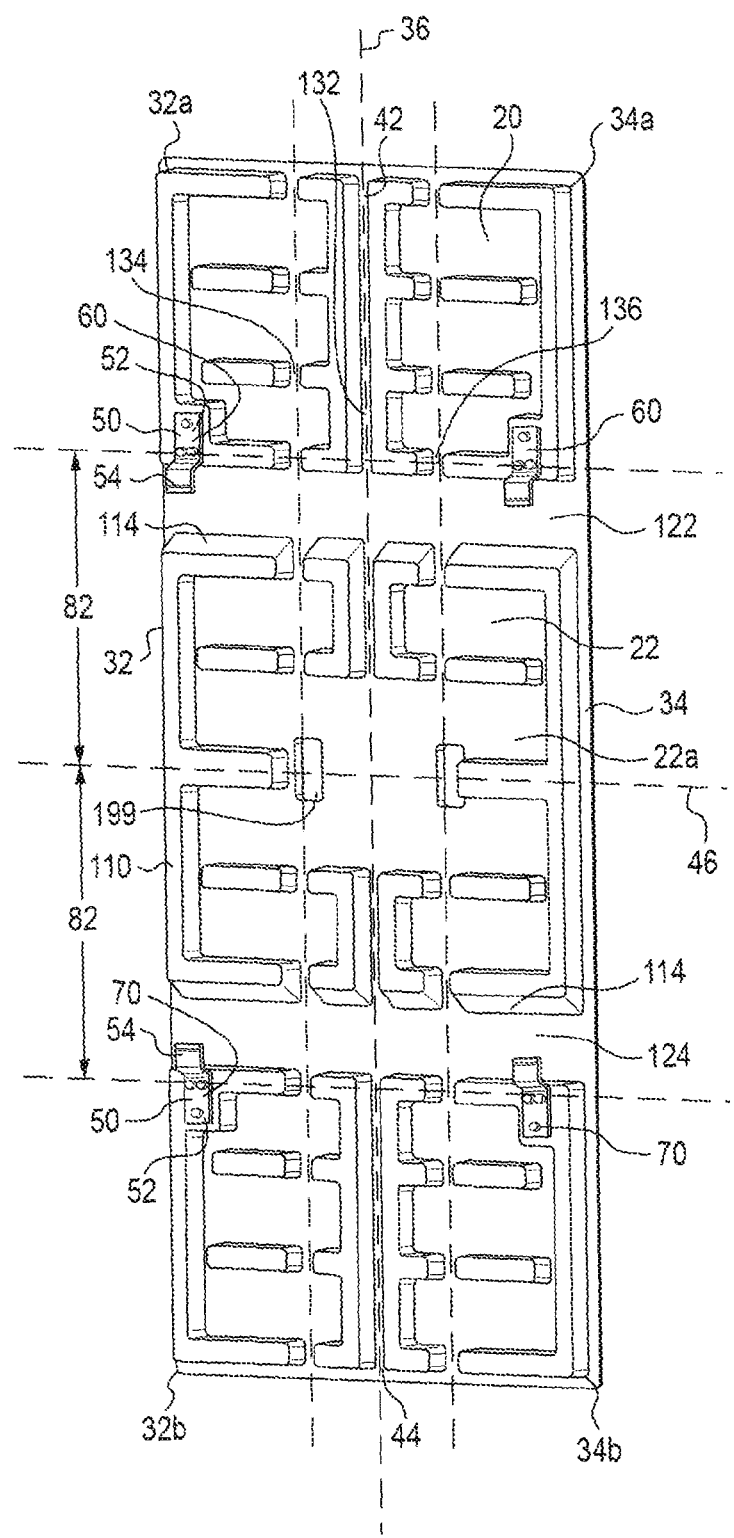
FIG. 2 is a perspective view of a front side of a panel that is used to construct a bulkhead.
Figure 3:
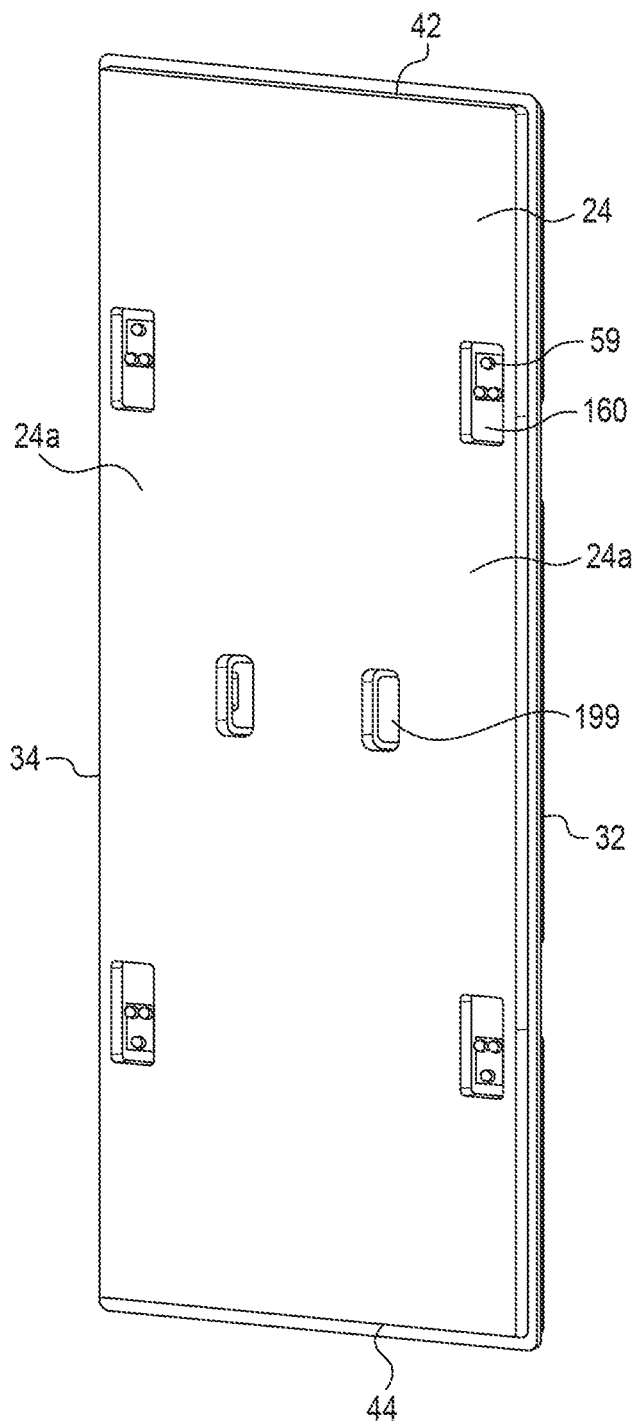
FIG. 3 is a perspective view of the back side of the panel of FIG. 2.
Figure 4:
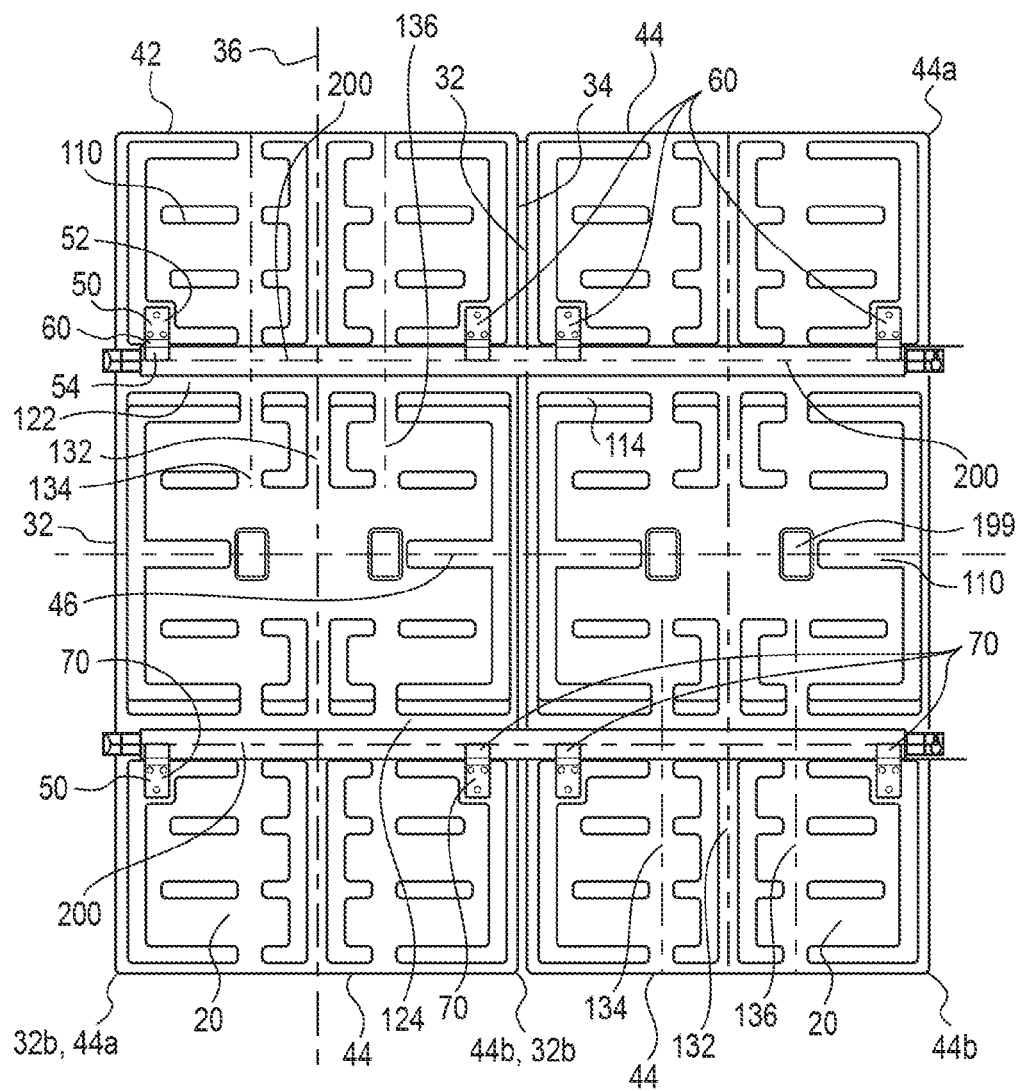
FIG. 4 is a front view of the bulkhead of FIG. 1.

The first side 22 of the panel includes a plurality of ribs 110 that extend outwardly of the plane P. The ribs 110 are sized and distributed to define the planar portions of the edges 32, 34, 42, 44 discussed above and one or more of the valleys 122, 124, 132, 134, 136 discussed elsewhere herein. In some embodiments, some ribs 110 (designated as 110a in FIG. 2) may be straight, while other ribs 110 (designated as 110b on FIG. 2) may have multiple straight components that extend from each other (such as forming a shape like a letter "L", a letter "E", a letter "C", or the like). As shown in FIG. 2, the ribs 110 may include portions that are generally perpendicular to each other, but in other embodiments, the ribs themselves, or portions of the ribs may be curved. One of ordinary skill in the art will understand with a thorough review of this specification that the ribs 110 may be configured and aligned upon the first side 22 of the panel for strength purposes as well as to define the valleys 122, 124, 132, 134, 1362 as desired.

As shown in FIG. 2, the panel may include two or more horizontal secondary valleys 122, 124 (named "secondary" because they are parallel to the secondary edges 42, 44, and the secondary centerline 46) that extend between the first and second primary edges 32, 34 and are each parallel to the first and second secondary edges 42, 44 and/or to a centerline of the panel 20 (discussed below as the secondary centerline 46) that extends between the first and second primary edges 32, 34. In embodiments where the panels 20 are disposed horizontally to form the bulkheads (stacked manner) the valleys would be the "primary valleys" because they would extend along the longer primary and would still be horizontal to receive the horizontally disposed beams therethrough. The secondary valleys 122, 124 may be positioned on opposite sides of the secondary centerline 46 and in some embodiments disposed equidistant from the secondary centerline 46.

The first side 22 of the panel 20 additionally includes a plurality of brackets 50 that are mounted thereupon. The brackets 50 are provided in a first row of a plurality of brackets 60 that corresponds to the first secondary valley 122 and a second row of a plurality of brackets 70 that corresponds to the second secondary valley 124. In embodiments where additional secondary valleys are provided, additional rows of a plurality of brackets that correspond to those secondary valleys may be provided as well.

Each of the first and second rows of brackets 60, 70 includes two or more brackets 50. In embodiments, where each row of brackets 60, 70 includes two brackets 50, each of the two brackets 50 within a row may be disposed upon opposite sides of a primary centerline 36, i.e. the centerline that extends through each of the first and second secondary edges 42, 44 and is parallel the first and second primary edges 32, 34. In some embodiments, the two brackets of each row of brackets 60, 70 are each spaced the same distance (82, FIG. 2) from the primary centerline 36. Each bracket 50 from each row of brackets 60, 70 may be disposed with the same relative position and orientation upon the panel 20, such that the cantilevered portion 54 (discussed below) of each bracket 50 within a row extends in the same manner. In embodiments where each row of brackets 60, 70 includes three or more brackets 50, the brackets are spaced along the length of the valley associated with the brackets so that, when installed as a bulkhead, the brackets 50 engage the beam at different positions along the length of the beam. The brackets may be positioned to not interfere with the primary valleys (named "primary" because they are parallel with the primary edges 32, 34) 132, 134, 136 that may extend in a direction parallel with the first and second primary edges 32, 34, to allow the panel to rest horizontally over beams 200 so that the beams extend through the primary valleys 132, 134, 136.

In some embodiments the brackets 50 in each of the first and second rows 60, 70 are constructed the same. The brackets 50 are best understood with reference to FIGS. 4, 5, 7, and 8. Each bracket 50 includes an engaging portion 52 and a cantilevered portion 54. The engaging portion 52 is configured to rest upon, or mate with the surface of the first side 22 of the panel 20 and be fixed thereto, such as with one or more fasteners 58 (as depicted in the figures) and/or be fixed to the first side 22 with adhesive, a keyed structure, a press fit, or other connection structures that are known in the art.

The engaging portion 52 may be fixed to the first side 22 of the panel 20 in a position and orientation such that the cantilevered portion 54 is associated with the respective first or second secondary valley 122, 124. In some embodiments the engaging portion 52 and panel 20 are arranged such that the engaging portion 52 rests upon a valley upon the panel or the surface along plane P, but in other embodiments the engaging portion 52 may rest upon a rib 110, or both a valley and a rib 110.

The cantilevered portion 54, when assembled upon the panel 20, provides a space 56 between the panel 20 and the cantilevered portion that is configured to receive a portion of a beam, such as a decking beam, therein when the decking beam extends horizontally through the respective first or second secondary valley 122, 124 associated with the bracket 50.

In some embodiments, and as shown in FIGS. 1, 5, 6, and 8, the cantilevered portion 54 may extend from the engaging portion 52 over at least a portion of the respective secondary valley 122, 124. The brackets 50 are disposed upon the panel 20 such that each cantilevered portion 54 extends toward the secondary centerline 46, and such that the cantilevered portions 54 from the first and second rows of brackets 60, 70 extend toward each other. In some embodiments, the space 56 created by the cantilevered portion 54 is disposed between the secondary centerline 46 and the engaging portion 52 of the respective bracket 50.

Depending upon the anticipated size of the beam (or the anticipated range of sizes of beams), as well as other geometry and positioning of the panel (e.g. the height of the rib 110 if the engaging portion 52 rests upon the rib 110), the cantilevered portion 54 may include a bend 54a from a plane through a portion of the engaging portion 52 from which the cantilevered portion 54 extends in order to result in a suitable space 56 between the panel 20 and the cantilevered portion to receive a beam within the space 56. In embodiments where the cantilevered portion 54 extends over a portion of the associated secondary valley (such that the space 56 extends between the cantilevered portion 54 and the surface of the panel 20 forming the valley), when a beam 200 is disposed through the secondary valley, the cantilevered portion 54 may contact one or both of a side surface 212 of the beam (opposite the side surface 211 of the beam that contacts the surface of the panel that forms the valley) and one of the top or bottom surfaces 210, 213 of the beam (depending upon which of the plurality of brackets is engaging the beam as discussed further below).

In the embodiment shown in FIG. 5, the cantilevered portion 54 only contacts the side surface 212 of the beam (as well as the corner of the beam between the top and side surfaces 210, 212) with the rib 110 contacting the top surface 210 of the beam. One of ordinary skill in the art with a thorough review of this specification would understand that it would be readily possible within the scope of this disclosure to modify the height of the rib 110 and/or the size and shape of the bracket 50 so that the cantilevered portion 54 further contacts the top surface 210 of the beam. The engagement between the beam and the cantilevered portion 54 of the bracket 50 (as well as the engagement between the beam and the surface of the panel 20) prevents the panel 20 from moving in at least one longitudinal direction with respect to the beam (either toward or away from the ceiling when installed in a cargo environment), and in some embodiments prevents the panel 20 from rotating about the axis of the beam 200.

Figure 1:
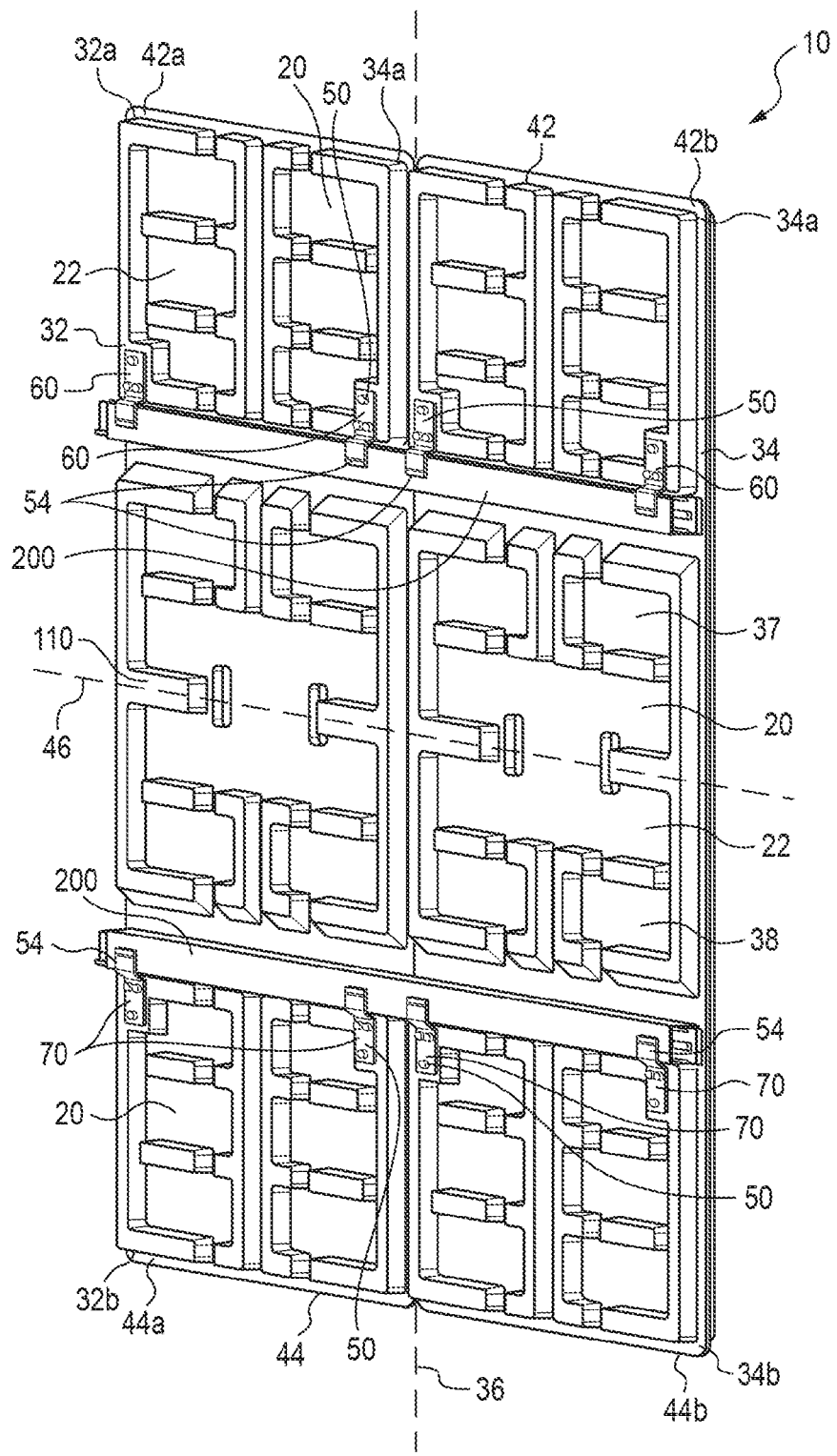
FIG. 1 is a perspective view of a bulkhead.

As discussed further herein and as shown in FIG. 1, when the panel 20 is installed to form a bulkhead (normally vertically within the cargo compartment) the cantilevered portions 54 from the brackets 50 in the first row of brackets 60 include a portion that extends downwardly (toward the second secondary edge 44) allowing a beam to extend through the space 56, such that the beam is engaged or in some embodiments closely surrounded on the right and left sides as well as the top of the beam by the bracket 50 and the panel's surface. This engagement prevents the panel 20 from being moved downwardly with respect to the beam, and prevents the panel 20 from rotating about the length of the beam.

In the same installation, the cantilevered portions 54 from the brackets 50 in the second row of brackets 70 include a portion that extends upwardly (toward the first secondary edge 42) allowing a beam to extend through the space 56, such that the beam is engaged or closely surrounded on the right and left as well as the bottom of the beam by the bracket 50 and the panel's surface. This engagement prevents the panel from being moved upwardly with respect to the beam, and prevents the panel from rotating about the length of the beam. Because each of the first and second rows of brackets 60, 70 includes at least two brackets 50 along the row that are spaced from each other, the two or more brackets 50 within each row contact the beam at different positions along the length of the respective beam, which prevents the panel from rotating about an axis parallel to the first and second primary edges 32, 34.

One of ordinary skill in the art will understand that the panel 20 when installed as a bulkhead 10 with the beams 200 associated with the first and second rows of brackets 60, 70 are fixed to side walls 501, 502 of an environment 500, and therefore the panels 20 (and the bulkhead 10) are only free to slide in a direction that is parallel to the length of the beams 200 or in other words, in a direction parallel to the first and second secondary edges 42, 44. Because the bulkhead 10 (and specifically the panels 20 that form the bulkhead) are normally sized with a width that is only slightly to the width of the environment (such as most only a few inches), the range of potential sliding in this direction is minimized. Also, in some embodiments the weight of the panel 20 and the friction between the surface of the panel 20 and the surfaces of the cantilevered portions 54 of the brackets 50 (at least the first row of brackets 60 and potentially within the second row of brackets 70) and the beam may result in the actual sliding of an installed bulkhead being minor, or nonexistent. In some embodiments, the beams 200 that interact with the brackets 50 may be capable of being locked in place upon the walls 501, 502 of the environment, which prevents the beams from being removed or repositioned within the environment, and locking the beams 200 effectively locks the bulkhead 10 in position as well.

As best shown in FIGS. 3, 6, 7, and 8, the second side of the panel 20 may include a plurality of recesses 160 that extend inwardly into the body of the panel from a surface 24a, such as a planar surface of the second side 24 of the panel 20. At least a portion of the plurality of recesses 160 are configured to provide a space to receive the cantilevered portion 54 of a bracket 50 therein when a panel 20 (with the plurality of recesses 160) is stacked above the same panel 20. The plurality of recesses 160 may also be sized to provide a space for a nut 59 or other fastener that is associated with a fastener 58 that is used to fix the bracket 50 onto the first side 20 of the panel 20, when provided. In embodiments with a plurality of recesses on the second side 24 of the panel, a recess 160 is provided to correspond to each bracket 50, such that each bracket 50 from the panel 20 below the specific panel is received within a recess 160 when stacked.

In some embodiments, the second side 24 of the panel 20 may include a plurality of ribs or valleys (not shown but similar to the structure and geometry of the ribs 110 and valleys 122, 124, 132, 134, 136 discussed and depicted with respect to the first side 22 of the panel), which may be provided for stacking purposes, for strength purposes, for weight purposes or for other reasons upon the panel 20.

In some embodiments, the panel 20 may include one or more holes 199 provided therethrough, which may be used for grabbing and holding onto the panel for ergonomic reasons. The holes 199 may be provided at convenient locations within the panel, and are normally sized big enough to allow a user's fingers to extend therethrough, but small enough to prevent objects from being passed through the panel 20 when installed as a bulkhead.

Figure 7:
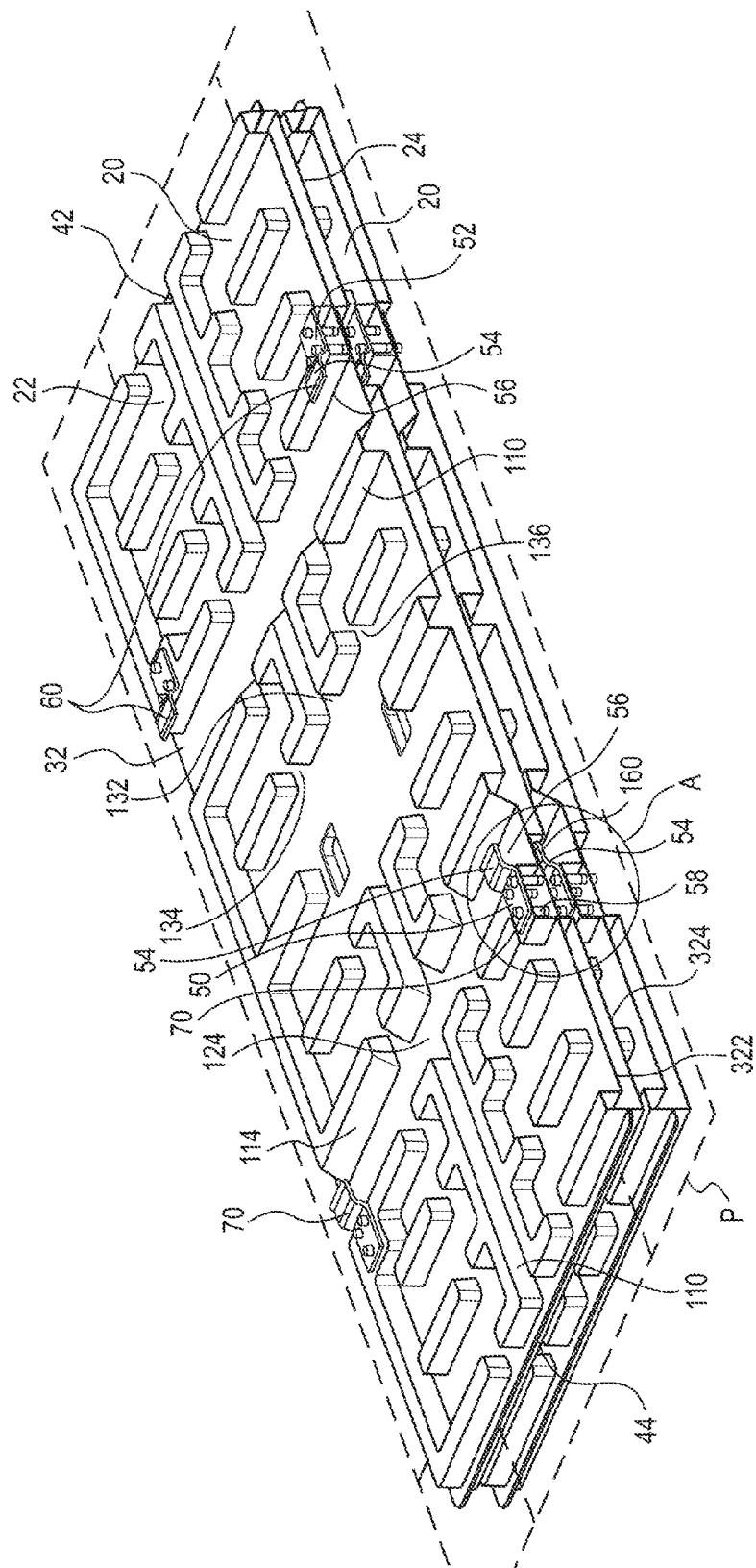
FIG. 7 is a cross-sectional view of two panels of FIG. 2 stacked together.
Figure 8:
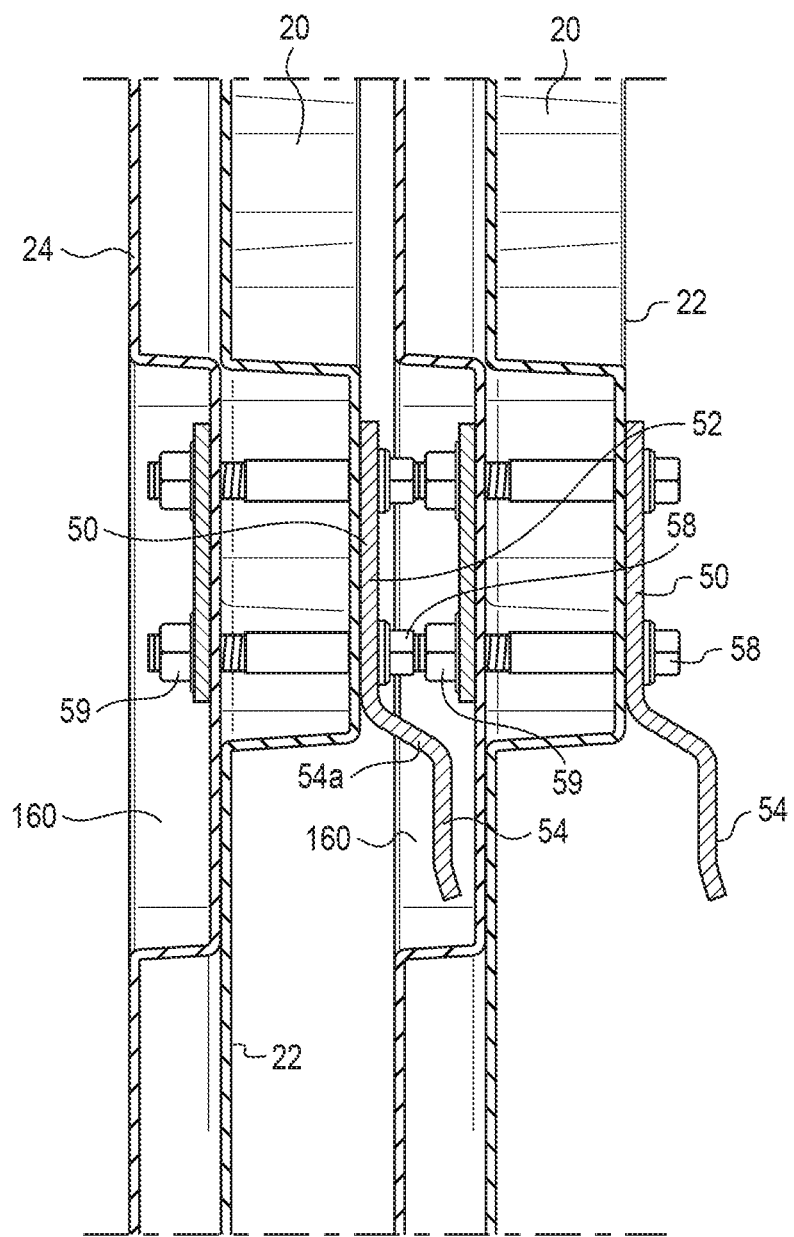
FIG. 8 is a side detail view of detail A of FIG. 7.

In some embodiments, one or more, or all of the plurality of ribs 110 may be relatively square or rectangular in cross-section. In some embodiments, some ribs may have chamfered or angled side walls 114, such as, as shown in FIGS. 2 and 7 in ribs 110 that are disposed proximate and in parallel to one or both of the first and second secondary valleys 122, 124. The chamfered or angled sides of these ribs 110 may provide extra clearance for the panel to be moved with respect to the beams 200 when installing the bulkhead, or may provide space for introducing the beams into the valleys 122, 124 when installing the bulkhead 10.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. A bulkhead, comprising:
 a panel with a first side and a second side, the first side and second side fixed together, the panel extends to parallel first and second primary edges (32, 34) and parallel first and second secondary edges (42, 44), opposite ends of the first and second primary edges each meet an end of one of the first and second secondary edges, each of the first and second primary edges each disposed perpendicular to each of the first and second secondary edges;
 the first side of the panel supports a first plurality of brackets and a second plurality of brackets, the first plurality of brackets disposed on a first side of a secondary centerline of the panel that is parallel to the first and second secondary edges, the second plurality of brackets disposed on a second side of the secondary centerline that is opposite from the first side of the secondary centerline;
 each of the first plurality of brackets and the second plurality of brackets includes an engaging portion that contacts the first side of the panel and a cantilevered portion that extends away from the first side of the panel and toward the secondary centerline,
 wherein each of the first plurality of brackets and the second plurality of brackets establish a space between the respective cantilevered portion and the first side of the panel,
 wherein the space of each of the first and second plurality of brackets is configured, in use, to selectively receive a respective first decking beam and a second decking beam therein, wherein the space defined by each bracket of the first and second plurality of brackets is disposed between the engaging portion of the respective bracket and the secondary centerline, wherein when one or both of the first and second decking beams are received within the space in the respective first and second plurality of brackets, the decking beams can be slidably withdrawn from the space by sliding the respective decking beam toward the secondary centerline, wherein each of the first plurality of brackets are aligned along a line that is parallel to the first and second secondary edges of the panel, and each of the second plurality of brackets are aligned along a second line that is parallel to the first and second secondary edges of the panel.

2. The bulkhead of claim 1, wherein the first plurality of brackets each are disposed a first distance from the secondary centerline and the second plurality of brackets are disposed the first distance from the secondary centerline.

3. The bulkhead of claim 2, wherein the engaging portion is a flat plate and is fixed to the first side of the panel, and wherein the cantilevered portion extends away from the engaging portion.

4. The bulkhead of claim 1, wherein the space of each of the first and second plurality of brackets is configured to receive a conventional "E" decking beam that is the respective first or second decking beam therein.

5. The bulkhead of claim 1, wherein, in use, the first side of the panel contacts a side surface of the respective first or second decking beam and the cantilevered portions of each of the first plurality of brackets contacts one or both of a top surface of the first decking beam or an opposite second side surface of the first decking beam, and the cantilevered portion of each of the second plurality of brackets contacts one or both of a bottom surface or an opposite second side of the second decking beam disposed in contact therewith.

6. The bulkhead of claim 1, wherein a portion of the first plurality of brackets are disposed upon a first side of a primary centerline of the panel that is parallel to the first and second primary edges, and remaining brackets of the first plurality of brackets are disposed on a second side of the primary centerline, and wherein a portion of the second plurality of brackets are disposed upon the first side of the primary centerline of the panel and the remaining brackets of the second plurality of brackets are disposed upon the second side of the primary centerline.

7. The bulkhead of claim 1, wherein the first side of the panel includes a plurality of elongate extensions disposed outwardly from a planar surface of the first side of the panel, wherein spaces upon the planar surface between at least a portion of the elongate extensions collectively define at least two secondary valleys that each extend between the first and second primary edges and in parallel to the secondary centerline, wherein the first plurality of brackets extend across at least a portion of the first of the at least two secondary valleys, and the second plurality of brackets extend across at least a portion of the second of the at least two secondary valleys.

8. The bulkhead of claim 7, wherein the plurality of elongate extensions are monolithically formed with the first side of the panel.

9. The bulkhead of claim 7, wherein at least a portion of the elongate extensions collectively define at least one primary valley that extends between the first and second secondary edges and in parallel to a primary centerline that extends in parallel to and centered between the first and second primary edges.

10. The bulkhead of claim 9, wherein the at least one primary valley is three primary valleys, a first of the primary valleys extends along the primary centerline, a second of the primary valleys extends on a first side of the primary centerline, and a third of the primary valleys extends on an opposite second side of the primary centerline.

11. The bulkhead of claim 10, wherein the second and the third of primary valleys are disposed about 16 inches apart, and are each disposed about 16 inches from the neighboring primary edge to the respective second or third primary valley.

12. The bulkhead of claim 9, wherein one of the at least one primary valleys is disposed about 24 inches from each of the first and second primary edges.

13. The bulkhead of claim 1, wherein the second side of the panel defines a plurality of recesses into the panel from a planar surface of the second side of the panel, wherein each of the plurality of recesses are disposed at a position upon the panel from which a bracket of the first or second plurality of brackets extends from the first side of the panel, such that when a second panel like the panel rests upon the panel in a parallel fashion to the panel with the primary edges and the secondary edges of the panel and the second panel vertically aligned and with the second side of the second panel facing the first side of the panel, the plurality of first and second brackets from the panel would be received within the respective plurality of recesses into the second panel.

14. The bulkhead of claim 9, wherein the panel is configured to be fixed in a vertical orientation with the primary centerline extending vertically and the secondary centerline extending horizontally and a second horizontal orientation wherein the primary and the secondary centerlines each extend horizontally, and wherein, in use, when the panel is fixed in a vertical orientation, a first beam may extend below and in contact with the first plurality of brackets and a second beam may extend above and in contact with the second plurality of brackets, wherein the panel is prevented from movement within an environment in a vertical direction and in a direction that extends perpendicularly to both the primary and secondary centerlines of the panel.

15. The bulkhead of claim 1, wherein the panel is formed from a first sheet that forms the first side of the panel and a second sheet that forms the second side of the panel, wherein the first and second sheets are fixed together along the first and second primary edges and the first and second secondary edges.

16. The bulkhead of claim 1, wherein the panel is formed from a single sheet.

17. The bulkhead of claim 7, wherein a plurality of the elongate extensions extend from the first side of the panel to define a plurality of valleys therebetween.

18. A bulkhead, comprising:
   a panel with a first side and a second side, the first side and second side fixed together, the panel extends to parallel first and second primary edges and parallel first and second secondary edges, opposite ends of the first and second primary edges each meet an end of one of the first and second secondary edges, each of the first and second primary edges each disposed perpendicular to each of the first and second secondary edges;
   the first side of the panel supports a first plurality of brackets and a second plurality of brackets, the first plurality of brackets disposed on a first side of a secondary centerline of the panel that is parallel to the first and second secondary edges, the second plurality of brackets disposed on a second side of the secondary centerline that is opposite from the first side of the secondary centerline;
   each of the first plurality of brackets and the second plurality of brackets includes an engaging portion that contacts the first side of the panel and a cantilevered portion that extends away from the first side of the panel and toward the secondary centerline,
   wherein the second side of the panel defines a plurality of recesses into the panel from a planar surface of the second side of the panel, wherein each of the plurality of recesses are disposed at a position upon the panel from which a bracket of the first or second plurality of brackets extends from the first side of the panel, such that when a second panel like the panel rests upon the panel in a parallel fashion to the panel with the primary edges and the secondary edges of the panel and the second panel vertically aligned and with the second side of the second panel facing the first side of the panel, the plurality of first and second brackets from the panel would be received within the respective plurality of recesses into the second panel.

19. The bulkhead of claim 18, wherein the panel is configured to be fixed in a vertical orientation with a primary centerline extending vertically and the secondary centerline extending horizontally and the primary centerline is parallel to and between the first and second primary edges extends vertically, and a second horizontal orientation wherein the primary and the secondary centerlines each extend horizontally, and wherein, in use, when the panel is fixed in a vertical orientation, a first beam may extend below and in contact with the first plurality of brackets and a second beam may extend above and in contact with the second plurality of brackets, wherein the panel is prevented from movement within an environment in a vertical direction and in a direction that extends perpendicularly to both the primary and secondary centerlines of the panel.

20. The bulkhead of claim 19, wherein each of the first plurality of brackets and the second plurality of brackets establish a space between the respective cantilevered portion and the first side of the panel,
   wherein the space of each of the first and second plurality of brackets is configured, in use, to selectively receive a respective first decking beam and a second decking beam therein, wherein the space defined by each bracket of the first and second plurality of brackets is disposed between the engaging portion of the respective bracket and the secondary centerline, wherein when one or both of the first and second decking beams are received within the space in the respective first and second plurality of brackets, the decking beams can be slidably withdrawn from the space by sliding the respective decking beam toward the secondary centerline.

* * * * *